United States Patent [19]
Aoki et al.

[11] Patent Number: 5,424,156
[45] Date of Patent: Jun. 13, 1995

[54] ELECTROSTATIC INFORMATION RECORDING MEDIUM AND METHOD OF RECORDING AND REPRODUCING ELECTROSTATIC INFORMATION

[75] Inventors: Daigo Aoki; Minoru Utsumi; Hiroyuki Obata, all of Tokyo, Japan

[73] Assignee: Dai Nippon Printing Co., Ltd., Tokyo, Japan

[21] Appl. No.: 838,206

[22] PCT Filed: Jul. 6, 1991

[86] PCT No.: PCT/JP91/00907
§ 371 Date: Mar. 5, 1992
§ 102(e) Date: Mar. 5, 1992

[30] Foreign Application Priority Data
Jul. 6, 1990 [JP] Japan .................. 2-179333

[51] Int. Cl.⁶ .................................. G03G 15/02
[52] U.S. Cl. ............................. 430/59; 430/55; 430/58; 430/65
[58] Field of Search .................. 430/20, 58, 65, 59, 430/48, 55

[56] References Cited
U.S. PATENT DOCUMENTS

| | | | |
|---|---|---|---|
| 4,582,772 | 4/1986 | Teuscher et al. | 430/58 |
| 4,906,545 | 3/1990 | Fukagai et al. | 430/58 |
| 4,956,255 | 9/1990 | Ueda | 430/59 |
| 5,051,328 | 9/1991 | Andrews et al. | 430/56 |
| 5,161,233 | 11/1992 | Matsuo et al. | 355/218 |

*Primary Examiner*—S. Rosasco
*Attorney, Agent, or Firm*—Dellett and Walters

[57] ABSTRACT

An electrostatic information recording medium according to this invention includes an inorganic oxide layer 3 and a photoconductive layer comprising a charge-generating layer 4 and a charge-transport layer 5 laminated onto an electrode 2 in this sequence, as illustrated in FIG. 1. To record information, the information is exposed to light while voltage is being applied between the electrode 3 and another opposite electrode, or alternatively voltage is applied therebetween while the information is being exposed to light.

After information recording, the electrostatic information recording medium is uniformly electrified on its surface as by corona charging, whereby the information can be easily reproduced in the form of electrostatic information. This recording medium, if tone-developed, can be used as an original plate for electrostatic printing.

5 Claims, 4 Drawing Sheets

ELECTROSTATIC INFORMATION RECORDING MEDIUM AND METHOD OF RECORDING AND REPRODUCING ELECTROSTATIC INFORMATION

TECHNICAL FIELD

The present invention concerns an electrostatic information recording medium capable of recording electrostatic information in dependence upon the quantity of exposure applied and a method of recording and reproducing electrostatic information.

BACKGROUND TECHNIQUE

Silver salt photography has been known so far as one of many high-sensitivity image pickup techniques. According to this photographic process, a picked-up image is recorded on a film, etc. through a development step and is reproduced as by using a silver salt emulsion (photographic paper, etc. ) or by scanning the developed film optically for display on a cathode ray tube (CRT).

Electrophotography has also been available, in which a photoconductive layer having an electrode applied onto it by vapor deposition is electrified all over its surface by corona charging in a dark place and then exposed to intense light to make the area exposed to light electrically conductive, so that charges can leak out of that area to provide an electrostatic latent image corresponding to the optical exposure on the photoconductive layer. The latent image is then developed by depositing toner at a polarity which is opposite to (or identical with) polarity of the residual electrostatic charges. This electrophotography has been used mainly for copying purposes, but may not generally be applied to picking up images due to its low sensitivity. Due to a short residence time of the charges, it is also required that the toner development be carried out immediately after forming the electrostatic latent image.

A currently available TV image pickup technique is designed to pick up images by an image pickup tube and obtain image information by using an optical semiconductor, which is in turn extracted as an electrical signal and either immediately displayed on a CRT or recorded in a video magnetic recording medium, etc. for display on a CRT at any desired time.

Silver salt photography provides an excellent means for preserving subjects' images: but needs complicated optical, electrical or chemical processings from hard copying to soft copying (CRT output) for reconstructing the images.

Electrophotography is found to be easier and speedier than silver salt photography in terms of developing the electrostatic latent image, but is much poorer in terms of how long the latent image is preserved and much more unsatisfactory in terms of the resolution of a developer, image quality, etc. than silver salt photography.

With the TV image pickup technique, line-sequential scanning is required for extracting and recording electrical image signals. Line-sequential scanning, which is carried out by electron beams in the case of an image pickup tube and by a magnetic head in the case of video recording, is much inferior to such planar analog recording as silver salt photography, because of its resolution being dependent upon the number of scan lines.

This is essentially true of the resolution of a TV image pickup system as well, which relies upon solid-state image sensors (e.g., CCDs) now in the making.

Problems inherent in these techniques are that the higher the quality and resolution of image recording, the more complicated the processing steps involved, or if the processing steps are simple, then there is no room for memory function or the basic image quality degrades.

In the course of having studied methods of recording electrostatic information wherein with a system having on its optical axis a photosensitive member which includes a photoconductive layer provided with an electrode on its front side and a charge carrier medium which is located in opposition thereto and includes a charge carrier layer provided with an electrode on its back side, the information is exposed to light with the application of voltage between both electrodes, thereby forming on the charge carrier medium an electrostatic latent image corresponding to the incident optical image, we have found that a specific photosensitive material itself can function as an excellent recording medium and be used as a novel electrostatic information-recording medium, and so have achieved this invention.

A major object of this invention is to provide a novel electrostatic information-recording medium as well as a method of recording and reproducing electrostatic information, which is applicable to electrostatic printing.

DISCLOSURE OF THE INVENTION

This invention provides a electrostatic information-recording medium characterized in that an inorganic oxide layer and a photoconductive layer are laminated on an electrode in this sequence.

This invention also provides a method of recording and reproducing electrostatic information characterized by using a system comprising an electrostatic information-recording medium having an inorganic oxide layer and a photoconductive layer laminated on an electrode in this sequence and an electrode located opposite thereto, exposing the information to light while voltage is being applied between both electrodes or applying voltage therebetween while the information is being exposed to light, thereby recording the electrostatic information on the electrostatic information-recording medium, corona-charging the surface of the photoconductive layer in the electrostatic information-recording medium or applying voltage between the electrode of the recording medium and another opposite electrode to form surface charges corresponding to the recorded information, and reproducing the surface charges by a surface potential-reading means, a toner-developing means or a liquid crystal display unit.

Further, this invention provides a method of printing the same visible information electrostatically on a multiplicity of plain paper sheets by using as a printing original plate an electrostatic information-recording medium having an inorganic oxide layer and a photoconductive layer laminated on an electrode in which electrostatic information has been recorded by either exposing the information to light while applying voltage between the electrode of the recording medium and another electrode located in opposition thereto or applying voltage therebetween while exposing the information to light, and repeating the steps of:

i) corona-charging the surface of the photoconductive layer in the electrostatic information-recording medium or applying voltage between the electrode of the recording medium and another opposite electrode, thereby forming surface charges corresponding to the recorded information, ii) developing the surface charges with a dry or wet type of toner, iii) transferring the toner on the surface of the recording medium electrostatically onto a plain paper sheet, iv) fixing the resulting toner image thermally, and v) cleaning the recording medium.

Still further, this invention provides a method of recording and reproducing electrostatic information characterized by positioning an electrostatic information-recording medium having an inorganic oxide layer and a photoconductive layer laminated sequentially on a first electrode in opposition to a second electrode, exposing the information to light while applying voltage between the first and second electrodes or applying voltage therebetween while exposing the information to light, thereby recording the electrostatic information on the electrostatic information-recording medium, positioning a charge carrier medium having a charge carrier layer laminated on a third electrode in opposition to the recording medium, applying voltage between the first and third electrodes to transfer the electrostatic information onto the charge carrier medium, and reproducing the electrostatic information on the charge carrier medium by a surface potential-reading means, a toner-developing means or a liquid crystal display unit.

Still further, this invention provides a method of electrostatically printing the same visible information on a multiplicity of plain paper sheets characterized by using as a printing original plate an electrostatic information-recording medium having an inorganic oxide layer and a photoconductive layer laminated sequentially on a first electrode and positioned in opposition to a second electrode, in which electrostatic information has been recorded by exposing the information to light while applying voltage between the first and second electrodes or applying voltage therebetween while exposing the information to light, and repeating the steps of:

i) positioning the recording medium in opposition to a charge carrier medium having a charge carrier layer laminated on a third electrode and applying voltage between the first and third electrodes to transfer electrostatic information onto the charge carrier medium, ii) developing the electrostatic information on the charge carrier medium with a dry or wet type of toner, and iii) fixing the resulting toner image thermally.

When the information is exposed to light while voltage is being applied between the electrode of the electrostatic information-recording medium on which the inorganic oxide and photoconductive layers are laminated in this sequence and the opposite electrode or voltage is applied between them while the information is being exposed to light, air discharge takes place between the area of the recording medium exposed to light and the opposite electrode, and this discharge continues as long as the information is exposed to light with the application of voltage. After the voltage is cut off, the recording medium is removed. With a uniform electric field applied to the recording medium, its area exposed to light looks as if made electrically conductive.

In this way, the information exposed to light is stored on the area of the electrostatic information-recording medium exposed to light; that is, it can be easily reproduced in the form of electrostatic information by corona-charging or otherwise electrifying its surface uniformly.

Although the detailed mechanism of such information recording and reproduction has yet to be clarified, it would appear that the electrostatic information has been stored on the inorganic oxide layer, because it remained intact even when the recording medium was heated to 80° and held there for 30 minutes after recording and because of the fact that the photoconductive layer has high charge-diffusing properties.

In terms of in what form the electrostatic information is recorded, the electrostatic information-recording medium of this invention can be clearly distinguished over that used with a conventional photosensitive material for electrophotography in which the electrostatic information is not only recorded on the photoconductive layer and allowed to be stored within only a short span of time, but dies out immediately upon being heated as well.

In addition, the electrostatic information recorded on the electrostatic information-recording and charge carrier media of this invention can be erased by heating them or applying to them an electric field inverse to that used for recording the electrostatic information; that is, they can be recycled.

BEST MODE FOR CARRYING OUT THE INVENTION

One embodiment of the electrostatic information-recording medium according to this invention will now be explained with reference to FIG. 1.

Figure 1:
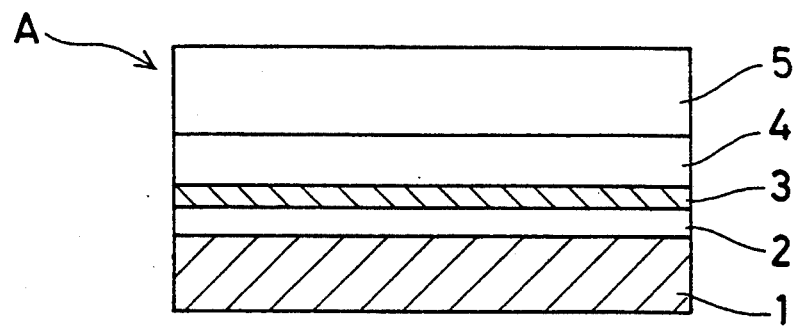
FIG. 1 is a sectional view of the electrostatic information-recording medium of this invention.

FIG. 1 is a sectional view of the present electrostatic information-recording medium shown generally by A, in which reference numeral 1 stands for a substrate, 2 an electrode, 3 an inorganic oxide layer, and 4 and 5 photoconductive layers or, in precise terms, a charge-generating layer and a charge-transport layer, respectively.

In this invention, it is believed that the inorganic oxide layer functions to block a dark current induced by the injection of charges from the electrode at the time of applying voltage, and has an additional function of acting as an electrostatic information-recording layer as well. According to this invention, it has been found that especially when silicon dioxide is used for such an inorganic oxide layer, the capability of the recording medium to record electrostatic information can be more increased than before. Also, use may be made of such inorganic oxides as $As_2O_3$, $B_2O_3$, $Bi_2O_3$, CdS, CaO, $CeO_2$, $Cr_2O_3$, CoO, $GeO_2$, $HfO_2$, $Fe_2O_3$, $La_2O_3$, MgO, $MnO_2$, $Nd_2O_3$, $Nb_2O_5$, PbO, $Sb_2O_3$, $SeO_2$, $Ta_2O_5$, $WO_3$, $V_2O_5$, $Y_2O_5$, $Y_2O_3$, $BaTiO_3$, $Bi_2TiO_5$, CaO—SrO, CaO—$Y_2O_3$, Cr—$SiO_2$, $LiTaO_3$, $PbTiO_3$, $PbZrO_3$, $ZrO_2$—Co and $ZrO_2$—$SiO_2$ as well as such inorganic compounds as AlN, BN, NbN, $Si_3N_4$, TaN, TiN, VN, ZrN, SiC, TiC, WC and $Al_4C_3$.

The inorganic oxide layer may be laminated and formed on the electrode surface by glow discharge, vapor deposition, sputtering or other techniques with a thickness that is determined depending upon what material is used. The layer, when formed of silicon dioxide, should preferably have a thickness in the range of 100 Å to 10,000 Å. Below 100 Å the silicon dioxide layer is too heterogeneous to have uniform information-recording properties, whereas above 10,000 Å the silicon dioxide layer is likely to crack, peel off or give rise to other defects. For instance, when a layer exceeding 10,000 Å in thickness is used with a film substrate or the like, cracking, etc. have a detrimental influence on its capability to record information.

The photoconductive layer will now be explained.

The photoconductive layer may consist of a charge-generating substance and a charge-transport substance. The charge-generating substances used, for instance, can be a bisazo compound having the following general formula (1):

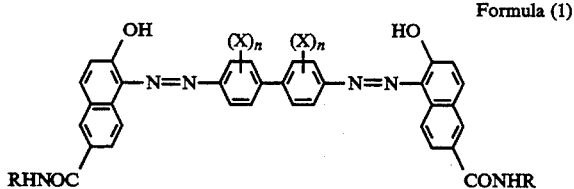

Formula (1)

where X's, which may be identical with or different from each other, are each selected from the group consisting of a hydrogen atom, a lower alkyl, lower alkoxy, nitro, sulfonic, hydroxyl or carboxyl group and a halogen atom, n is an interger of 0–3, and R is a hydrocarbon cyclic, heterocyclic or alkyl group which may have a substituent.

Set out below are typical compounds expressed by the above formula (1) and having the following substituent combinations, say, Compounds Nos. 1–23.

| No. | X | n | R |
|---|---|---|---|
| 1 | Cl | 1 | phenyl |
| 2 | Cl | 1 | p-chlorophenyl |
| 3 | Cl | 1 | 1-naphthyl |
| 4 | Cl | 1 | m-trifluoromethylphenyl |
| 5 | Cl | 1 | 2-thiazolyl |
| 6 | Cl | 1 | 2,5-dimethoxy-4-chlorophenyl |
| 7 | Cl | 1 | m-stearyl |
| 8 | Cl | 2 | phenyl |
| 9 | Br | 1 | phenyl |
| 10 | Br | 1 | p-chlorophenyl |
| 11 | F | 1 | p-methoxyphenyl |
| 12 | $CH_3$ | 1 | phenyl |
| 13 | $CH_3$ | 1 | o-methylphenyl |
| 14 | $CH_3$ | 1 | 2-thiazolyl |
| 15 | $C_2H_5$ | 1 | phenyl |
| 16 | $OCH_3$ | 1 | phenyl |
| 17 | $OCH_3$ | 1 | p-chlorophenyl |
| 18 | $OCH_3$ | 1 | o-methylphenyl |
| 19 | $OC_2H_5$ | 1 | m-chlorophenyl |
| 20 | $NO_2$ | 1 | m-nitrophenyl |
| 21 | $SO_3H$ | 1 | 2,5-dimethoxy-4-chlorophenyl |
| 22 | OH | 1 | m-methylphenyl |
| 23 | COOH | 1 | o-methoxyphenyl |

The most preferable bisazo compounds of all have the following structural formulae:

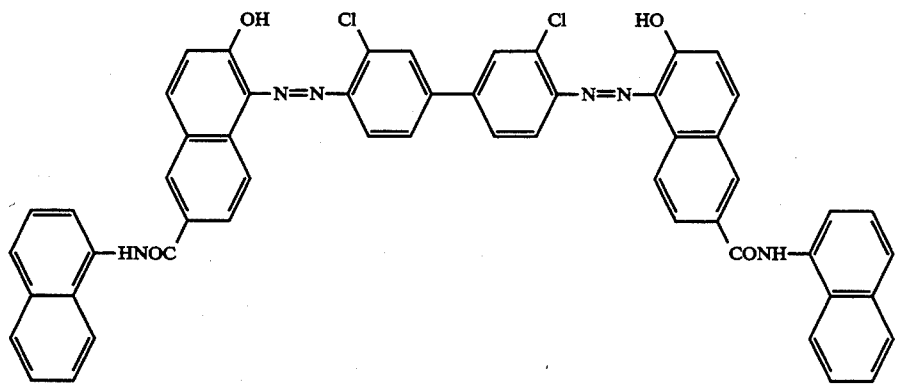

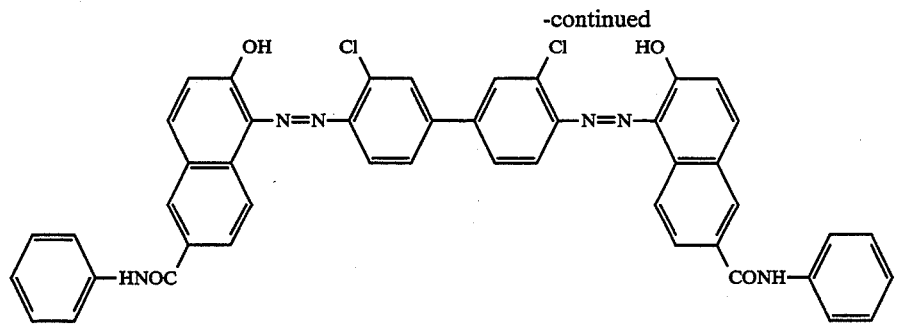

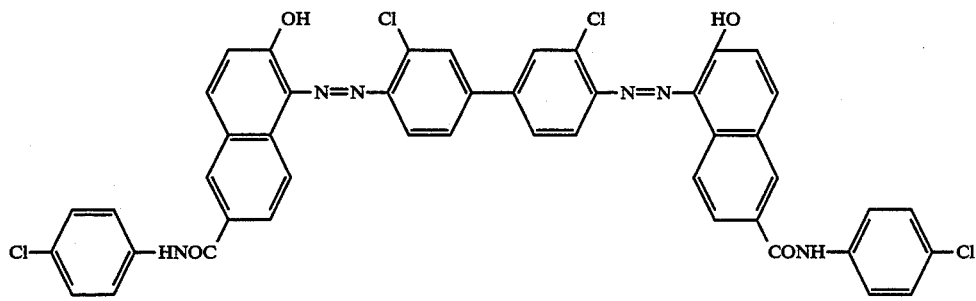

Explanation will now be made as to the charge-transport substances.

They are well capable of transporting charges induced in the charge-generating substances and, for instance, are represented by hydrazone, pyrazoline, PVK, carbazole, oxazole, triazole, aromatic amine, amine, triphenylmethane and polycyclic aromatic compounds, irrespective of whether capable of transporting either holes or electrons. Among others, preference is given to the following compounds Nos. 24–33:

24

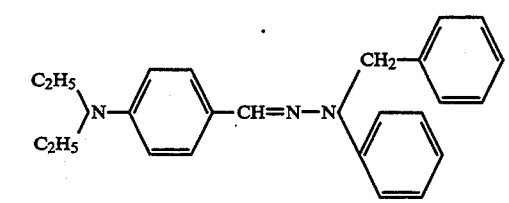

25

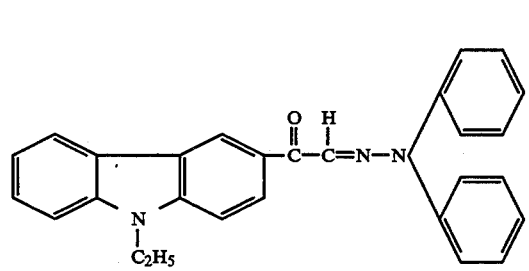

26

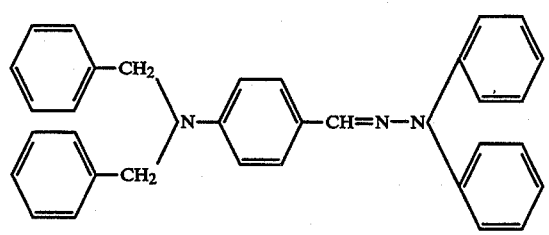

-continued

27

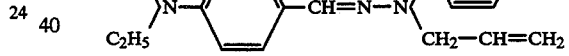

28

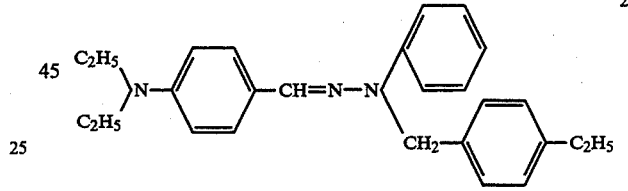

29

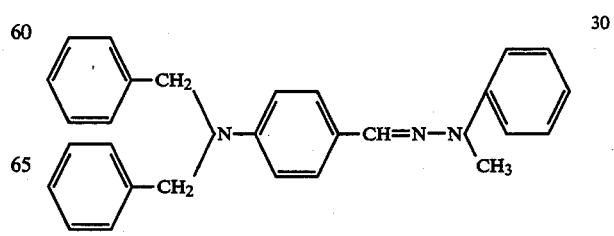

30

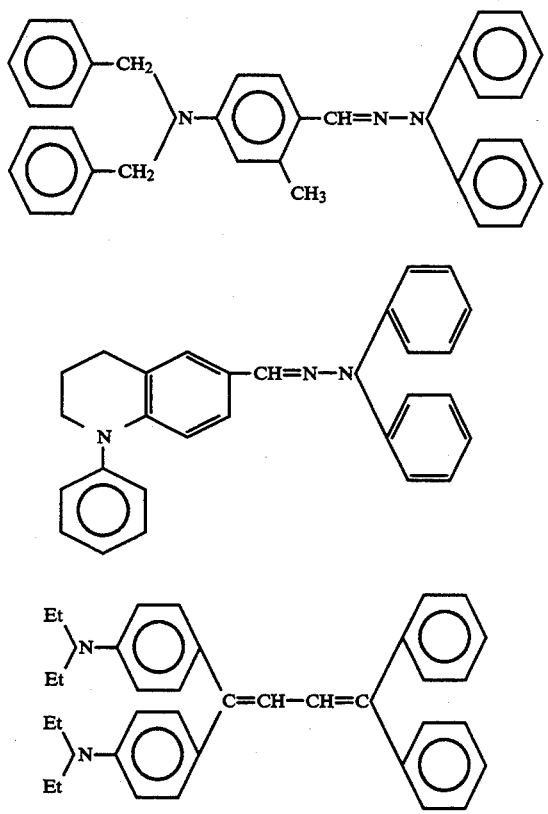

The photoconductive layer formed of such charge-generating and -transport substances are broken down into two types, one referred to as a monolayer type and the other as a function separation type.

The monolayer type of photoconductive layer is obtained by laminating a mixture of the charge-generating and -transport substances onto the inorganic oxide layer. To this end, a mixture of the charge-generating and -transport substances at a part-by-weight ratio of 1:100 to 100:100 is dispersed or dissolved in a solvent with or without a binder, and the resulting solution is coated onto the inorganic oxide layer, followed by drying. A preferable film thickness lies in the range of 1 μm to 50 μm.

Such a monolayer type of photoconductive layer may also be provided by forming a complex of the charge-generating and -transport substances and laminating onto the inorganic oxide layer the complex which serves as a charge-transfer complex having charge-generating and -transport functions at the same time. Such combinations, for instance, may be represented by polyvinylcarbazole-trinitrofluorenone. Polyvinyl-carbazole is sensitive to an ultraviolet region alone and trinitro-fluorenone has a sensitivity to a frequency region in a matter of 400 nm, but the PVK-TNF complex is photosensitive to a frequency region of up to 650 nm.

Next, the function separation type of photosensitive material will be explained.

Generally, the charge-generating substance is capable of absorbing light to generate charges (electrons and hole pairs) but, at the same time, has the property of trapping charges and so is unsuitable for charge transport. The charge-transporting substance, on the other hand, is well capable of transport charges but ill capable of generating charges. Thus, the function separation type of photosensitive material makes the best use of the respective properties inherent in both the substances, and is obtained by laminating the charge-generating and -transport layers onto the inorganic oxide layer in this order. In this connection, it is noted that the order of lamination of the charge-generating and -transport layers may be reversed; that is, the inorganic oxide layer may be laminated thereon with the charge-transport layer and then the charge-generating layer.

For lamination, the charge-generating substance in the form of fine particles (having a diameter of at most 5 μm, preferably at most 3 μm, more preferably at most 1 μm) is first dispersed with a binder resin, etc. in a suitable solvent, and the dispersion is coated onto the inorganic oxide layer and dried to form the charge-generating layer. Then, a binder resin-containing solution or dispersion of the charge-transport substance in a suitable solvent is coated onto the charge-generating layer to form the charge-transport layer. The charge-generating and -transport layers should preferably be 0.1 μm to 10 μm and 1 μm to 50 μm in thickness, respectively, as measured after drying.

The binder resins used to this end, for instance, may be silicone, styrene-butadiene copolymer, epoxy, acrylic, saturated or unsaturated polyester, polycarbonate, polyvinyl acetal, phenolic, polymethyl methacrylate (PMMA), melamine and polyimide resins, and should preferably be used in an amount lying in the range of 0.1 part by weight to 10 parts by weight per part by weight of each substance.

It is also understood that the photoconductive layer may be obtained by such suitable means as blade coating, dipping, spinner coating and flexography as well.

Except where a metal sheet is used as the support, the electrode of the electrostatic information-recording medium according to this invention is formed on the support, and may be formed of any desired material having a specific resistance value not higher than $10^6 \Omega \cdot cm$. For this invention, electrodes formed of electrically conductive films made of inorganic metals, inorganic metal oxides or organic materials such as quaternary ammonium salts may be used.

When the information-bearing light need not pass through the electrostatic information-recording medium, an opaque electrode such as one formed of an aluminium metal sheet may be used. Although the electrode is required to have a varying thickness depending upon the electrical properties of the material forming the electrode of the photosensitive member and the magnitude of voltage applied for recording information, it may be 100 Å to 3000 Å in thickness, when formed of aluminium.

When it is required to pass the information-bearing light through the electrostatic information-recording medium, the electrode must be transparent thereto. For instance, if the information-bearing light is in a visible region (400 nm to 700 nm), use is then made of a transparent electrode obtained by sputtering or vapor depositing indium oxide-tin oxide ($In_2O_3$—$SnO_2$) (ITO for short) or tin oxide onto the support in the form of a 100 Å to 3000 Å-thick film or coating an ink composition of their fine particles and a binder onto the support; a semitransparent electrode prepared by the vapor deposition or sputtering of Au, Al, Ag, Ni, Cr or the like onto the support; or an organic transparent electrode obtained by coating tetracyanoquinodimethane (TCNQ), polyacetylene or the like onto the support. This also holds when the information-bearing light is in an infrared region (higher than 700 nm). In some cases, however, use may also be made of a colored, visible light-absorbing electrode so as to cut off visible light. Basically, the above electrode materials may all be used with ultraviolet (not higher than 400 nm) information-bearing light; however, an electrode material (e.g., an organic polymer material or soda glass) which absorbs ultraviolet rays is not preferred to this end. It is thus preferred to use an ultraviolet-transmitting material such as quartz glass.

The support of the electrostatic information-recording medium may be formed of any desired material, if it has strength enough to support the recording medium, and is not particularly critical in terms of thickness. For instance, use may be made of a flexible plastic film having a thickness of, e.g., about 100 $\mu$m, or a rigid sheet of about 0.5 to 10 mm in thickness, such as a glass or plastic sheet. Bear in mind that when the information-bearing light is incident on the support through the electrostatic information-recording medium, it must be transparent to that light.

Generally speaking, it is preferred that an anti-reflection film be applied onto the surface of the support on which the information-bearing light strikes. This anti-reflection film may be applied onto the support in the form of single or plural layers as by the vapor deposition or sputtering of such an inorganic material as magnesium fluoride or titanium oxide.

How to record electrostatic information on the electrostatic information-recording medium of this invention will now be explained with reference to FIG. 2, wherein B stands for a flat sheet electrode, 11 a flat sheet support for supporting the electrode, 12 a flat sheet electrode, E a power source and P information-bearing light.

First, the electrostatic information is exposed to light while voltage is being applied between the electrode 2 of the recording medium A held positive and the flat sheet electrode B, or voltage is applied between them while the electrostatic information is being exposed to light, thereby recording that information on the recording medium A. Alternatively, the application of voltage may be permitted to tune with the exposure of the information to light by an optical shutter kept in tune with a power source switch. After the exposure of the information to light, the electrode B is removed to make information recording complete.

The flat sheet electrode B used for recording the electrostatic information may be similar to that of the electrostatic information-recording medium A, and may or may not be supported. For instance, this electrode B may be either a metal sheet or a transparent sheet such as an ITO sheet.

Preferably, the recording medium A should be spaced 3 to 5-$\mu$m away from the flat sheet electrode B and a spacer such as a plastic film is inserted between them. In an alternative embodiment of this invention, the recording medium A may be in close contact with the flat sheet electrode B. Between the electrodes 2 and B there may be applied a voltage of about 700 V to 1500 V.

When carrying out the method of recording electrostatic information according to this invention, the information may be input by the use of an electrostatic camera or laser.

With the electrostatic camera, a recording member is built up of a photosensitive material and a charge carrier medium, rather than of a photographic film used with an ordinary camera. Then, voltage is applied between their electrodes to make the photoconductive layer electrically conductive in dependence upon the quantity of incident light, thereby accumulating on the charge carrier medium charges in a quantity corresponding to the quantity of incident light. For this electrostatic camera either a mechanical shutter or an optical shutter may be used.

Alternatively, the light information may be separated through a prism or color filter into R, G and B light components in the form of parallel light beams, which may be used with three electrostatic information-recording media to form one frame, or which may be focused onto one plane to form R, G and B images to form one frame, for the purpose of picking up color images.

For recording the electrostatic information by laser, an argon (514.488 nm), helium-neon (633 nm) or semiconductor (780 nm, 810 nm, etc.) laser may be used as a light source for conducting laser exposure corresponding to image, character, cord or line signals by scanning. Recording analog information such as images is done by modulating the intensity of laser light, while recording digital information like characters, cords or line images is done by placing laser light under on-off control. A dotted image, on the other hand, is formed by placing laser light under dot generator on-off control. Note that the spectral characteristics of the photoconductive layer in the electrostatic information-recording medium need not be panchromatic and may be sensitive enough to the wavelength of a laser light source.

Reference will now be made to how to reproduce the information which has been exposed to light and stored on the electrostatic information recording medium of this invention.

The electrostatic information-recording medium of this invention, in which the electrostatic information has been stored in the form of the information exposed to light, can be used in itself as a recording medium. In order to reproduce the information which has been exposed to light, recorded and stored on the recording medium, the photoconductive layer thereof is uniformly electrified on its surface as by corona charging or voltage is applied thereon with an additional electrode, thereby obtaining the electrostatic information corresponding to that information exposed to light. Then, the surface charges are toner developed, or alternatively the surface potential is read by such a potential reader as will be described later to generate signals for display on a GRT.

Figure 3:
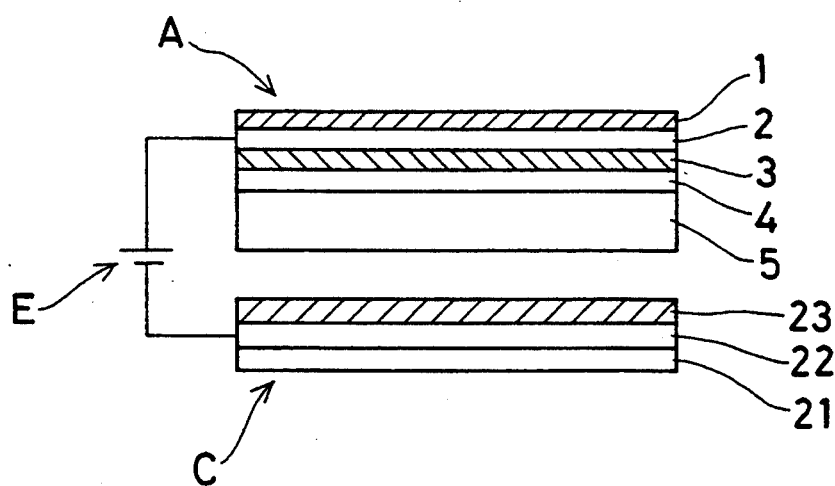
FIG. 3 illustrates how to record electrostatic information on a charge carrier medium making use of the electrostatic information-recording medium of this invention.

Further, the electrostatic information-recording medium of this invention, in which the information exposed to light has been stored, may be used as an original plate for recording electrostatic information on the charge carrier medium, as illustrated in FIG. 3 wherein G stands for a charge carrier medium, 21 a support, 22 an electrode, 13 a charge carrier layer and E a power source.

The charge carrier medium G is formed by laminating the charge carrier layer 23 onto the electrode 22, said charge carrier layer 23 being formed of a high-insulating high-molecular material so as to prevent charge transfer and so being required to have a high insulating property equal to or higher than $10^{14}$ $\Omega$.cm. The high-molecular material constituting the charge carrier layer must have a glass transition temperature that is equal to or higher than the ambient temperature at which the electrostatic information-recording medium is used.

Such high-molecular materials may include a thermoplastic resin, a thermosetting resin, an energy beam setting resin such as ultraviolet or electron beam setting resin, engineering plastics or the like. The thermoplastic resins, for instance, may include fluoroplastics such as polytetrafluoroethylene, fluorinated ethylenepropylene, tetrafluoroethylene-perfluoroalkyl vinyl ether copolymer or their dispersion or modified (coating) type of resin, a polyether ether ketone resin or poly-para-xylene. These resins may be dissolved in a solvent to prepare a resin solution, which is then applied onto the electrode of the charge carrier medium as by coating or vapor deposition, thereby forming a layer having a thickness of 1 $\mu$m to 100 $\mu$m.

In order to record electrostatic information on the charge carrier medium using the electrostatic information-recording medium of this invention, the charge carrier medium is set with respect to the recording medium with a gap of 3 $\mu$m to 50 $\mu$m between them. Then, voltage is applied through the power source E between the electrode 2 of the recording medium A held positive and the electrode 22 of the charge carrier medium C held negative.

With the voltage applied between both the electrodes, charges are injected from the electrode 22 into the area—in which the information exposed to light has been stored—of the recording medium A, so that it is made electrically conductive, inducing discharge between the recording and charge carrier media A and C and thereby accumulating on the charge carrier medium C charges corresponding to that information exposed to light. Subsequent removal of the charge carrier medium C makes it complete to record the information on the charge carrier medium C. In order to retain the charges accumulated on the charge carrier medium C over an extended period of time, it is desired that an insulating protecting layer be laminated onto the charge carrier layer after electrostatic information storage.

It is understood that by applying voltage between the electrostatic information-recording medium, in which the information has been recorded, and the charge carrier medium, it is possible to develop the charges formed on the charge carrier medium with toner and thereby visualize them in the form of a toner image.

Reference will now be made to how to reproduce the electrostatic information in the case where the information recorded on the electrostatic information-recording or charge carrier medium is in the form of surface charges.

Figure 4:
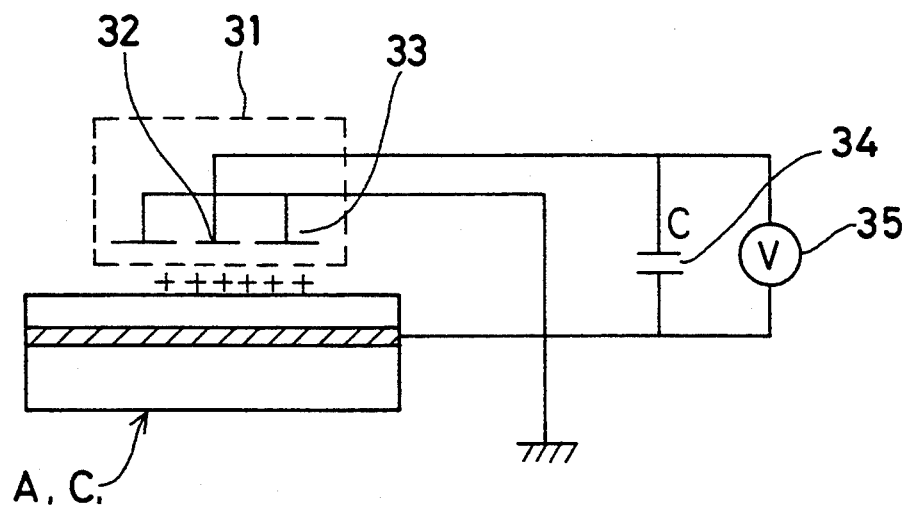
FIG. 4 is a view showing an example of how to carry out a d.c. amplification type of potential reading.

An example of how to read the potential on the electrostatic information-recording or charge carrier medium is illustrated in FIG. 4 wherein the same reference numerals as in FIG. 1 stand for the same parts. In connection with FIG. 4, it is noted that A or C stands for an electrostatic information-recording medium or a charge carrier medium, 31 a potential reader means, 32 a detecting electrode, 33 a guard electrode, 34 a capacitor and 35 a voltmeter.

With the potential reading means 31 positioned opposite to the surface of the charge carrier or recording medium C or A on which charges have been built up, such charges cause an electric field to act on the detecting electrode 32, inducing charges on the surface thereof in an quantity equal to that of the charges on the charge carrier medium G. Thus, the capacitor 34 is electrified with the charges which are opposite in polarity and equal in quantity to the above induced charges; that is, there is a potential difference between the capacitor 34 and the electrode 32, which is in turn read by the voltmeter 35 to find the potential of the charge carrier medium. Then, the charge carrier medium C is scanned on its surface by the potential reading means 31 to output the electrostatic latent image in the form of electrical signals. It is understood that the reason for providing the grounded guard electrode 33 around the detecting electrode 32 is that with the detecting electrode 32 alone, an electric field (electric lines of force) is produced by charges lying over an area of the charge carrier medium C that is wider than that opposite to the detecting electrode 32, giving rise to a drop of resolution power. The guard electrode 33 enables the electric lines of force to direct vertically with respect to a plane; that is, the electric lines of force act on only the area of the charge carrier medium C opposite to the detecting electrode 32, so that the potential of the region of the medium C substantially equal in area to the detecting electrode 32 can be read. The accuracy and resolution of potential reading vary considerably in dependence upon the geometries and sizes of the detecting and guard electrodes 32 and 33 as well as upon the space between them and the charge carrier medium G; that is, the system must be designed to conform to the best performance conditions demanded.

Alternatively, information reproduction may be accomplished by irradiating the recording or charge carrier medium A or C, in which the information has been stored in the form of electrostatic charges, with laser or other light to make use of polarization caused by the electrostatic charges through an electro-optical crystal. For the electro-optical crystal which is located in the optical path, use may be made of lithium niobate (LiNbO$_3$), barium titanate, lithium tantalate (LiTaO$_3$) or other crystals, which all have an electro-optical effect.

Figure 5:
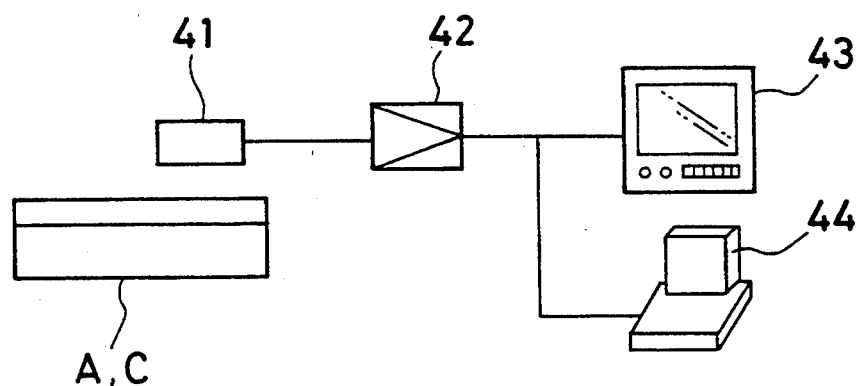
FIG. 5 is a schematic view of an example of electrostatic information reproduction.

How to reproduce the electrostatic information is schematically illustrated in FIG. 5 wherein reference numeral 41 stands for a potential reader, 42 an amplifier, 43 a CRT and 44 a printer.

Referring to FIG. 5, charge potentials are detected by the potential reader 41 to produce an output, which is then amplified by the amplifier 42 for display on the CRT 43 or printing-out by the printer 44. In this case, the area of the recording or charge carrier medium A or C to be read may arbitrarily be selected at any desired time for output or repeatedly reproduced. In addition, the electrostatic latent image is obtained in the form of electric signals; that is, it may be recorded or otherwise processed by other media, if required.

Figure 6:
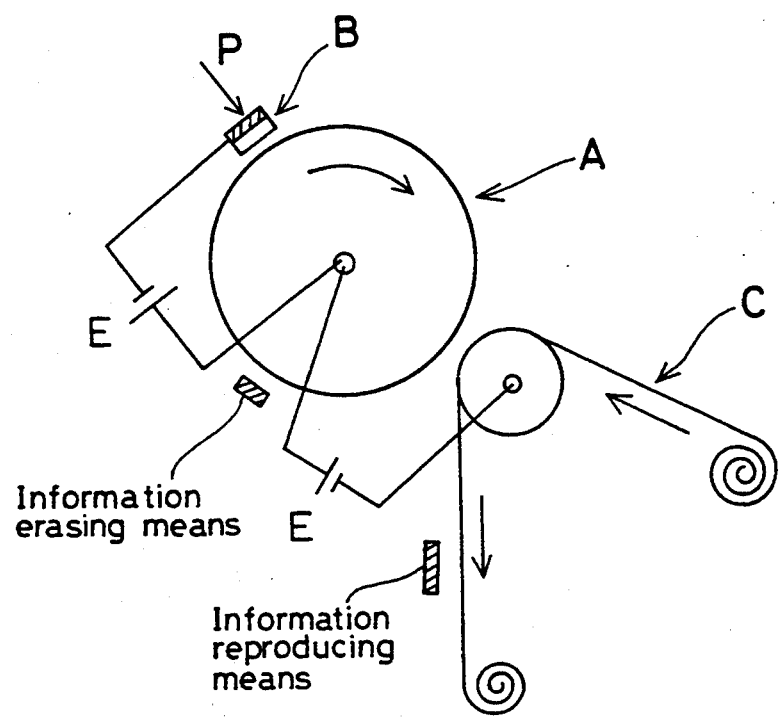
FIG. 6 illustrates another example of how to record electrostatic information on a charge carrier medium making use of the electrostatic information-recording medium of this invention.

The charge carrier medium may be used in the form of a continuous, flexible film as well. As illustrated in FIG. 6, a film form of charge carrier medium A is located in opposition to a drum form of electrostatic information-recording medium A with a given space between them. In this case, the charge carrier medium C is wound around a drum located in opposition to and spaced away from the recording medium A at a given interval such that it is movable in opposite relation to the recording medium A. As can be seen from FIG. 6, an exposure means, a flat sheet electrode B, a heating source for erasing the electrostatic information, etc. are provided for the recording medium A, and in the path along which the charge carrier medium C is moved there are a potential reader and a toner-developing and -fixing means, for instance.

A power source E then applies voltage between the electrode of the recording medium A acting as a positive electrode and the flat sheet electrode B as a negative electrode, and vice versa.

In this case, the information is first recorded on the recording medium A by exposure to light, as shown at P, and the information thus exposed to light is transferred onto the charge carrier medium C. The information-bearing charges corresponding to the information thus exposed to light and stored in the charge carrier medium C is reproduced by a reproducing means.

If the charge carrier layer of the charge carrier medium C is formed of a thermoplastic resin, it is then possible to form on the surface of the charge carrier medium C a frosted image corresponding to the information-bearing charges by a so-called frosting phenomenon—a process in which the surface of the thermoplastic resin is shrunk corresponding to the information-bearing charges on the surface of the charge carrier medium C by heating the surface of the charge carrier medium C to a temperature higher than the softening point of the thermoplastic resin, using the frosted image-forming heating source as the information-reproducing means. This frosted image, for instance, lends itself well to documents for OHP equipment, microfilms and other similar purposes.

The electrostatic information-recording medium of this invention may be used as a master plate for electrostatic printing as well. The electrostatic information-recording medium is exposed to light having a wavelength showing photoconductivity from the transparent sheet electrode side through a complete document to be printed, whereby an electrically conductive pattern corresponding to the complete document is stored in that recording medium. In this case, the electrostatic information-recording medium may be in either flat sheet or drum form. When a flat sheet form of recording medium is used for printing, it may be wound around a roller.

Then, the charge carrier medium is placed in opposition to the electrostatic information-recording medium with a gap between them, followed by the application of voltage between their electrodes. This induces discharge on the area of the recording medium which is made electricaly conductive in dependence upon the quantity of light, giving rise to an electrostatic charge pattern of the same polarity on the charge carrier medium. The electrostatic charge pattern will later be visualized by toner development. Thus, the electrostatic charge pattern need not be held over an extended span of time; that is, the charges are unlikely, or less likely, to attenuate in the course of forming the electrostatic latent image to toner development. In this case, repeated electrostatic printing can be done stably, because the toner is not deposited directly onto the electrostatic information-recording medium. It is here to be noted that the original pattern used should be of a negative type, because the electrical conductivity of the area of the recording medium exposed to light is enhanced.

Further, the toner can be transferred onto plain paper by uniformly pre-charging the surface of the electrostatic information-recording medium likewise subject to light patterning, toner-developing the resulting electrostatic pattern and subjecting the plain paper to corona charging from its back side with the opposite polarity. In this case, the complete document to be printed may be of a positive type, because the area of the recording medium not exposed to light is charged for toner development.

Figure 7:
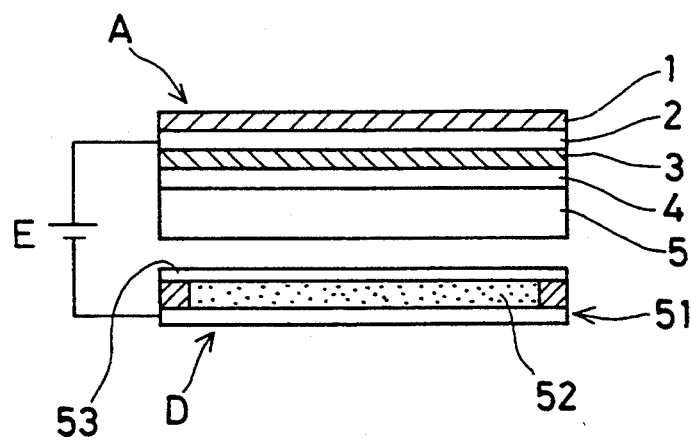
FIG. 7 illustrates how to reproduce electrostatic information on a liquid crystal display.

How to reproduce the electrostatic information stored on the electrostatic information-recording or charge carrier medium of this invention with the use of a liquid crystal display unit will now be explained specifically with reference to FIG. 7, wherein A stands for an electrostatic information-recording medium, D a liquid crystal display unit, 51 a liquid crystal electrode, 52 a liquid crystal element, 53 a support formed as of glass, and E a power source.

As illustrated, the recording medium A is positioned in opposition to the display unit D with a space of, e.g., 10 $\mu$m between them. As a voltage that is low enough to prevent any air discharge from occurring is applied the electrode 2 of the recording medium A and the liquid crystal electrode 51, a high electric field is impressed on the liquid crystal display unit D to display thereon an image corresponding to the quantity of information-bearing charges, because there is an increase in the quantity of charges injected from the electrode 2 into the area of the recording medium A in which the information exposed to light is recorded.

The present invention will now be explained more specifically but not exclusively with reference to the following examples.

EXAMPLE 1

A 0.1-$\mu$m thick transparent electrode layer (100$\Omega$/sq.) of indium oxide-tin (ITO) was formed onto a (1.1-mm thick) glass substrate by EB vapor deposition (at $10^{-6}$Torr), and silicon dioxide was then laminated thereon to a thickness of 1000 Å by sputtering at $10^{-2}$Torr.

Then, 3 parts by weight of a bisazo dye or Compound No. 1 and 1 part by weight of polyvinyl acetal were dispersed in a 1:1 mixed solvent of dioxane and cyclohexanone to obtain a dispersion containing 2% by weight of solid matter, which was further well dispersed in a ball mill and coated onto the above inorganic oxide layer by a blade coater with a gap thickness of 2 mils and dried thereon at 100° C. for 1 hour, thereby forming a charge-generating layer of about 0.3 $\mu$m in thickness.

Further prepared was a solution of 15 parts by weight of a charge-transport substance or Compound No. 24 and 10 parts by weight of a polycarbonate resin (made by Mitsubishi Gas Chemical Co., Ltd. and available under the trade name of Yupiron S-1000) in a 4:6 mixed solvent of dichloromethane and 1,1,2-trichloroethane, said solution containing 17.8% by weight of solid matter. This solution was then applied onto the above charge-generating layer by a blade coater with a gap thickness of 4 mils and dried at 80° C. for 2 hours, thereby laminating thereon a charge-transport layer of about 10 $\mu$m in thickness. Thus, an electrostatic information-recording medium according to this invention was prepared.

EXAMPLE 2

The procedures of Ex. 1 were followed with the exception that aluminium oxide instead of silicon dioxide was EB vapor-deposited (at a degree of vacuum of $10^{-6}$Torr) to obtain a laminated film of 1000 Å in thickness, thereby preparing an electrostatic information-recording medium of this invention.

EXAMPLE 3

The procedures of Ex. 1 were followed with the exception that zirconium oxide instead of silicon dioxide was EB vapor-deposited (at a degree of vacuum of $10^{-6}$ Torr) to obtain a laminated film of 1000 Å in thickness, thereby preparing an electrostatic information-recording medium of this invention.

COMPARATIVE EXAMPLE 1

The procedures of Ex. 1 were followed with the exception that titanium oxide instead of silicon dioxide was EB vapor-deposited (at a degree of vacuum of $10^{-6}$ Torr) to obtain a laminated film of 1000 Å in thickness, thereby preparing an electrostatic information-recording medium for the purpose of comparison.

COMPARATIVE EXAMPLE 2

The procedures of Ex. 1 were followed with the exception that no inorganic oxide layer was provided, thereby preparing an electrostatic information-recording medium for the purpose of comparison.

EXAMPLE 4

Figure 2:
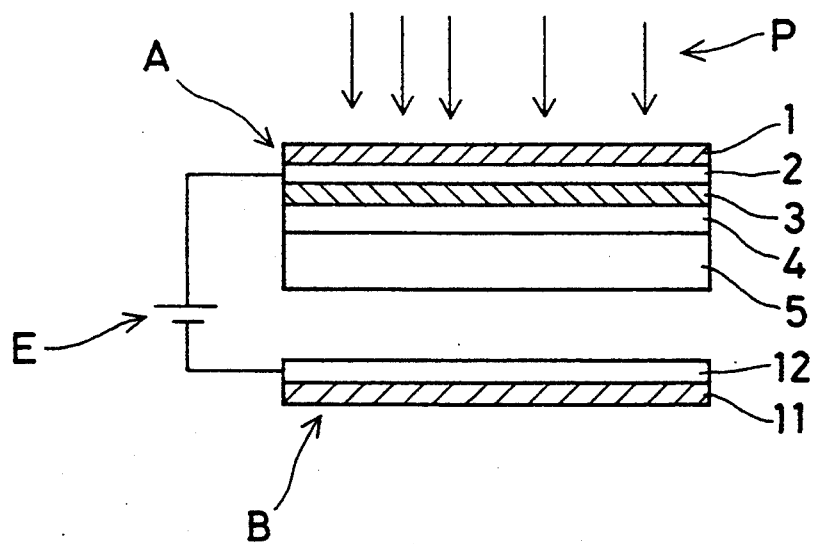
FIG. 2 illustrates how to record electrostatic information on the electrostatic information-recording medium of this invention.

A 0.1-$\mu$m thick aluminium electrode layer (100$\Omega$/sq.) was vapor deposited onto a (1.1-mm thick) glass substrate to prepare a flat sheet electrode, which was positioned in opposition to each of the recording media obtained in Examples 1-3 and Comparative Examples 1-2 with a gap of 9 $\mu$m between them, as illustrated in FIG. 2. While the system was irradiated with light of 30 $\mu$W/cm$^2$ (having a color temperature of 3200° K.) from the recording medium through a gray scale ("Step Wedge" made by Fuji Photo Film Co., Ltd.), +600 volts were applied between the electrode of the recording medium held positive and the flat sheet electrode held negative for 0.1 second in varied quantities of exposure.

Apart from the above, a 1000-Å thick aluminium electrode layer was laminated onto a 1-mm thick glass substrate by vapor deposition (at $10^{-5}$ Torr), and a 5% solution of a fluorine-containing resin "Cytop" (made by Asahi Glass Co., Ltd. and having a water absorption of 0.01% and a specific resistance of $1 \times 10^{18} \Omega$.cm) in a fluorine solvent was applied onto the thus obtained aluminium electrode by spinner coating (at 500 rpm for 30 seconds). The resulting coat was then dried to prepare a charge carrier medium of about 3 $\mu$m in thickness. This charge carrier medium was placed in opposition to each of the above recording media with a gap of 9 $\mu$m between them and through a spacer, as illustrated in FIG. 3. Then, +750 volts were applied between the recording medium held positive and the charge carrier medium held negative under dark conditions for 0.1 second to transfer the electrostatic information onto the charge carrier medium.

After that, the charge carrier medium was removed to measure the potential stored on the charge carrier medium corresponding to the quantity of exposure with a noncontact type of potential reader (Treck "Model 344"). The relation between the potential stored on the charge carrier medium and the quantity of light to which each electrostatic information-recording medium was exposed is graphically illustrated in FIG. 8.

Figure 8:
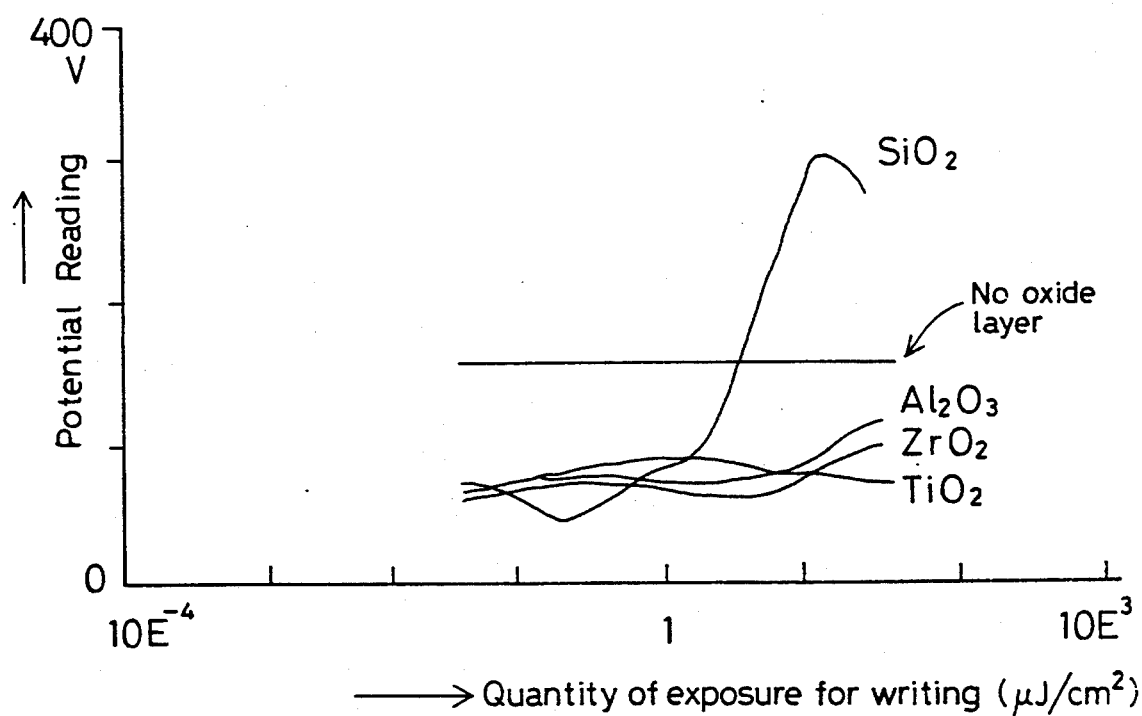
FIG. 8 is a graph showing the relation between the electrostatic potential transferred onto the charge carrier medium and the quantity of exposure.

As can be appreciated from FIG. 8, the potential corresponding to the gray scale began to be stored from the quantity of exposure of 1 $\mu$J/cm$^2$, and reached substantial saturation at 10 $\mu$J/cm$^2$. The maximum quantity of exposure at an exposure time of 0.1 second being 3 $\mu$J/cm$^2$, it is found that the electrostatic information-recording medium of this invention showed sensitivity even at an exposure time of 0.1 second. Since the dark area had a potential of about 80 volts and the bright area a potential of (a high) about 400 volts, the contrast potential of the quantity of exposure was about 320 volts.

It is also noted that as the quantity of exposure with respect to the electrostatic information-recording medium increases, there is an increase in the stored potential transferred onto the charge carrier medium. In particular, when silicon dioxide is used for the inorganic oxide layer, excellent electrostatic information-recording properties are achieved.

The electrostatic information recorded on the electrostatic information-recording medium may be erased by heating as well. For instance, no erasure could take place by a 40-minute heating at 80° C., but upon heated for a further 60 minutes, the information could be well erased.

EXAMPLE 5

Following the procedures of Ex. 4, the information exposed to light was recorded on the electrostatic information-recording medium prepared in Ex. 1. Then, a voltage of 600 volts was applied between the electrode of the recording medium held positive and the opposite flat sheet electrode (an aluminium electrode) held negative for uniform charging. After this, development was carried out with a wet type of toner ("MRP Toner" made by Ricoh Co., Ltd.) to form on the recording medium a toner image corresponding to the electrostatic information.

As a result of irradiating this recording medium with uniform light (from a halogen lamp of 100 $\mu$w/cm$^2$) from the support, a transmission image corresponding to the image made by toner development was formed on the toner image side. By scanning a receptor element (photomultiplier), a current was obtained in a quantity corresponding to the quantity of light transmitted.

While plain paper was being placed over the toner image surface of the electrostatic information-recording medium, it was subject to corona charging with the opposite polarity from its back side. As a result, toner transfer took place on the plain paper.

After that, the electrostatic information-recording medium was washed and cleaned on its surface with an isopar(Reg. trademark) and then again subjected to uniform charging with the opposite electrode. As a result, a toner image similar to the first one was formed on the recording medium, and the area exposed to light of the recording medium showed a continued electrical conductivity, which means that the recording medium can be used for electrostatic printing.

EXAMPLE 6

A mixed solution composed 10 g of a methylphenyl silicone resin ("TR144" made by Toshiba Silicon Co., Ltd. ) and 10 g of a 1:1 mixed solvent of xylene and butanol was stirred together with 1% by weight (0.2 g) of a curing agent (catalyst) ("CR-15" made by Toshiba Silicon Co., Ltd.), and then coated onto a 150-$\mu$m thick polyethylene film having a 1000 $\mu$m thick aluminium layer vapor deposited on it, using a doctor blade with a gap thickness of 4 mils. After this, drying was carried out at 150° C. for 1 hour to obtain a charge carrier medium of 10 $\mu$m in thickness.

Then, the toner image formed on the electrostatic information-recording medium in Ex. 5 was transferred onto the above charge carrier medium by toner-developing the recording medium, bringing it in contact opposition to the charge carrier medium prior to drying the recording medium, and applying a voltage of 300 volts between their electrodes for 1 second, with the electrode of the charge carrier medium held positive.

After that, the electrostatic information-recording medium was washed and cleaned on its surface with an isopar and again subject to uniform charging, using the opposite electrode as in Ex. 5, for the purpose of toner development. As a result, a toner image similar to the first one was formed on the recording medium, and the area thereof exposed to light showed a continued electrical conductivity, which means that this recording medium can be used for electrostatic printing.

EXAMPLE 7

After the information exposed to light had been recorded on the electrostatic information-recording medium prepared in Ex. 1 in the same manner as described in Ex. 4, a voltage of 600 volts was again applied between the electrode of the recording medium and the opposite electrode held negative, just after which the electrostatic potential (positive charges) on the recording medium was read in a dark place with a noncontact type of potential reader (Treck "Model 344) used in Ex. 4. As a result, it was found that the reading of the stored potential corresponds to the quantity of exposure.

EXAMPLE 8

A transparent, electrically conductive film was formed on a 3-mm thick glass substrate as in Ex. 1, and a methylphenyl silicone resin layer was further formed thereon as in Ex. 6, thereby preparing a charge carrier medium.

Using the electrostatic information-recording medium prepared in Ex. 1, the procedures of Ex. 4 were followed with the exception that a Cr striped pattern glass was used instead of the gray scale.

It is here noted that the Cr striped pattern used comprised an array of stripes arranged within an area of 20 mm $\times$ 30 mm, which were provided at a 20 $\mu$m interval (on a portion including Cr) with respect to a Cr-etched portion (of the glass substrate alone) having a line width of 10 $\mu$m.

With the application of voltage, the electrostatic information-recording medium prepared in Ex. 1 and a flat sheet electrode of aluminium were exposed to light through the Cr striped pattern (the aluminium electrode held negative, 650 V, 30 $\mu$w/cm$^2 \times$ 1-second exposure), thereby giving a pattern showing a continued electrical conductivitiy on the striped area exposed to light.

After voltage had been applied between the recording medium having the information stored on it and the above charge carrier medium (a gap of 9 $\mu$m, the electrode of the charge carrier medium used as a negative electrode, 750 V and 0.1 second), toner development was done with a wet type of toner colored red (R)- (negatively charged), followed by drying and fixation. As a result, an R toner striped image was formed, having a line width of 10 $\mu$m (with a space of 20 $\mu$m).

Then, the same electrostatic information-recording medium and charge carrier medium were used for the same exposure as mentioned above, while the recording medium was moved parallel with the stripe lines by a distance of 10 $\mu$m. The resulting striped pattern image was now developed with a wet type of toner colored green (G)—(negatively charged)—in the same manner as mentioned above, followed by drying and fixation.

While the electrostatic information-recording medium was moved by a further 10 $\mu$m, development with a wet type of toner colored blue (B), drying and fixation were likewise done.

By the above process, an RGB striped image having a size of 20 mm $\times$ 30 mm and a line width of 10 $\mu$m was obtained on the charge carrier medium, which provided a striped color filter.

This electrostatic information-recording medium had its information-stored area showing a continued electrical conductivity; that is, a plurality of similar striped color filters could be prepared by repeating the above process.

INDUSTRIAL APPLICABILITY

The electrostatic information-recording medium according to this invention is capable of keeping the information recorded on it even when held in a state heated at 80° C. for 30 minutes, and enables the information recorded on it to be easily reproduced in the form of electrostatic information by uniform charging, e.g., corona charging. This electrostatic information can then be transferred onto plain paper as by toner development, and so can be used as an original plate for electrostatic printing.

By applying voltage between the electrode of the recording medium according to this invention and the electrode of the charge carrier medium located in opposition thereto, said charge carrier medium having a charge carrier layer laminated onto that electrode, the information recorded on the recording medium can also be easily transferred onto the charge carrier medium. Thus, this recording medium can be used as an original plate for transferring the electrostatic information permanently onto the charge carrier medium.

What is claimed is:

1. A method of recording and reproducing electrostatic information characterized by using a system comprising an electrostatic information recording medium having a silicon dioxide layer of 100 Å to 10,000 Å in thickness, an electric charge generating layer containing bis-azo type compound, and an electric charge transport layer containing hydrazone type compound sequentially laminated on an electrode and an electrode located in opposition thereto, exposing the information to light while voltage is being applied between both said electrodes or applying voltage therebetween while the information is being exposed to light, thereby recording the electrostatic information in the electrostatic information recording medium, corona-charging the surface of the photoconductive layer of the electrostatic information recording medium or applying voltage between the electrode of the recording medium and another opposite electrode to form surface charges corresponding to the recorded information, and reproducing the surface charges by a surface potential-reading means, a toner-developing means or a liquid crystal display unit.

2. A method of recording and reproducing electrostatic information as claimed in claim 1, characterized in that a toner image reproduced by said toner-developing means is optically read.

3. A method of electrostatically printing the same visible information on a multiplicity of plain paper sheets by using as a printing original plate an electrostatic information recording medium having a silicon dioxide layer of 100 Å to 10,000 Å in thickness, an electric charge generating layer containing bis-azo type compound, and an electric charge transport layer containing hydrazone type compound sequentially laminated on an electrode in which electrostatic information has been recorded by either exposing the information to light while voltage is being applied between the electrode of said recording medium and an electrode located in opposition thereto or applying voltage therebetween while the information is being exposed to light, and repeating the steps of:

i) corona-charging the surface of the photoconductive layer in said recording medium or applying voltage between the electrode of said recording medium and another opposite electrode, thereby forming surface charges corresponding to the recorded information, ii) developing the surface charges with a dry or wet type of toner, iii) transferring the toner on the surface of said recording medium electrostatically onto a plain paper sheet, iv) fixing the resulting toner image thermally, and v) cleaning said recording medium.

4. A method of recording and reproducing electrostatic information characterized by positioning an electrostatic information recording medium having a silicon dioxide layer of 100 Å to 10,000 Å in thickness, an electric charge generating layer containing bis-azo type compound, and an electric charge transport layer containing hydrazone type compound sequentially laminated on a first electrode in opposition to a second electrode, exposing the information to light while voltage is being applied between the first and second electrodes or applying voltage therebetween while the information is being exposed to light, thereby recording the electrostatic information on said recording medium, positioning a charge carrier medium having a charge carrier layer laminated on a third electrode in opposition to said recording medium, applying voltage between the first and third electrodes to transfer the electrostatic information onto said charge carrier medium, and reproducing the electrostatic information on said charge carrier medium by a surface potential-reading means, a toner-developing means or a liquid crystal display unit.

5. A method of printing the same visible information electrostatically on a multiplicity of plain paper sheets characterized by using as a printing original plate an electrostatic information recording medium having a silicon dioxide layer of 100 Å to 10,000 Å in thickness, an electric charge generating layer containing bis-azo type compound, and an electric charge transport layer containing hydrazone type compound sequentially laminated on a first electrode and positioned in opposition to a second electrode, in which electrostatic information has been recorded by exposing the information to light while voltage is being applied between the first and second electrodes or applying voltage therebetween while the information is being exposed to light, and repeating the steps of:

i) positioning said recording medium in opposition to a charge carrier medium having a charge carrier layer laminated on a third electrode and applying voltage between the first and third electrodes to transfer electrostatic information onto said charge carrier medium, ii) developing the electrostatic information on said charge carrier medium with a dry or wet type of toner, and iii) fixing the resulting toner image thermally.

* * * * *